United States Patent
Alcantar et al.

(10) Patent No.: US 10,737,680 B2
(45) Date of Patent: Aug. 11, 2020

(54) SPEED CONTROL OF SUPER POSITIONING TORQUE VECTORING DIFFERENTIAL

(71) Applicant: Ford Global Technologies, LLC, Dearborn, MI (US)

(72) Inventors: Jose Velazquez Alcantar, Canton, MI (US); Joseph Jay Torres, Dearborn, MI (US); Peter James Barrette, Jupiter, FL (US); Rajit Johri, Canton, MI (US); Ming Lang Kuang, Canton, MI (US); Corwin Stout, Ann Arbor, MI (US); Jonathan Craig Sullivan, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 212 days.

(21) Appl. No.: 15/969,830

(22) Filed: May 3, 2018

(65) Prior Publication Data
US 2019/0338842 A1    Nov. 7, 2019

(51) Int. Cl.
*B60W 10/16*    (2012.01)
*F16H 48/36*    (2012.01)
(Continued)

(52) U.S. Cl.
CPC ............... *B60W 10/16* (2013.01); *B60K 1/02* (2013.01); *B60K 2001/001* (2013.01); *B60K 2023/043* (2013.01); *B60W 2520/125* (2013.01); *B60W 2520/14* (2013.01); *B60W 2520/266* (2013.01); *B60W 2520/28* (2013.01);
(Continued)

(58) Field of Classification Search
CPC ....... B60W 2520/26; B60W 2520/266; B60W 2520/28; B60W 2520/125; B60W 2520/14; B60W 2540/18; B60W 2540/10; B60W 2540/103; B60W 2710/12; B60W 2720/26; B60W 2720/266; B60W 2720/28; B60W 2720/406
See application file for complete search history.

(56) References Cited

U.S. PATENT DOCUMENTS 5,343,970 A * 9/1994 Severinsky ............ B60K 6/387
                                                  180/65.25
7,909,126 B2    3/2011 Gaffney
(Continued)

FOREIGN PATENT DOCUMENTS

CN    101629622 A    1/2010
EP    2288532 B1    12/2012

*Primary Examiner* — David R Morris
*Assistant Examiner* — James J Taylor, II
(74) *Attorney, Agent, or Firm* — David B. Kelley; Brooks Kushman P.C.

(57) ABSTRACT

An electrified axle system includes a pair of wheels, a super positioning torque vectoring differential coupled between the wheels, and a controller. The super positioning torque vectoring differential includes a traction motor and a vectoring motor. The controller operates the vectoring motor in speed control mode to reduce a speed difference between the wheels responsive to the difference exceeding a threshold, and operates the vectoring motor in torque control mode responsive to the difference falling within a target range and an accelerator pedal position achieving a value that depends on lateral acceleration associated with the system.

15 Claims, 3 Drawing Sheets

(51) Int. Cl.
  *B60K 1/00* (2006.01)
  *B60K 1/02* (2006.01)
  *B60K 23/04* (2006.01)

(52) U.S. Cl.
  CPC ..... *B60W 2540/10* (2013.01); *B60W 2540/18* (2013.01); *B60W 2710/12* (2013.01); *B60W 2720/406* (2013.01); *F16H 2048/364* (2013.01)

(56) References Cited

U.S. PATENT DOCUMENTS

| | | | |
|---|---|---|---|
| 8,505,669 B2 | 8/2013 | Ueda et al. | |
| 9,266,528 B2* | 2/2016 | Raftry | B60W 50/038 |
| 10,065,527 B2* | 9/2018 | Honda | B60K 17/354 |
| 2012/0150376 A1* | 6/2012 | Ash | B60L 7/26 |
| | | | 701/22 |
| 2014/0324290 A1* | 10/2014 | Dornhege | B60W 10/16 |
| | | | 701/41 |

* cited by examiner

SPEED CONTROL OF SUPER POSITIONING TORQUE VECTORING DIFFERENTIAL

TECHNICAL FIELD

This disclosure relates to vehicle control by way of super positioning torque vectoring differentials.

BACKGROUND

Torque vectoring technology provides a differential with the ability to vary the torque to each wheel, which can improve launch and handling. This method of power transfer is common in certain rear-wheel and all-wheel drive vehicles. Some front-wheel drive vehicles also have torque vectoring differentials.

Differentials conventionally include mechanical components. A torque vectoring differential typically includes an electronic monitoring system in addition to standard mechanical components. The electronic system controls the mechanical components to vary the torque.

The impact of torque distribution is the generation of a yaw moment arising from longitudinal forces and changes to the lateral resistance generated by each tire. Applying more longitudinal force reduces the lateral resistance that can be generated. Driving conditions dictate the trade-off between damping or exciting yaw acceleration.

SUMMARY

A vehicle includes a super positioning torque vectoring (SPTV) differential coupled between a pair of wheels, and a controller. The controller, responsive to a speed difference between the wheels exceeding a threshold, operates the SPTV differential in speed control mode to reduce the difference, and responsive to the difference achieving a target range and an accelerator pedal position achieving a value that depends on lateral acceleration of the vehicle, exits the speed control mode.

A method for a vehicle includes by a controller, responsive to turning of the vehicle, operating a super positioning torque vectoring differential in torque control mode, responsive to wheel speed difference exceeding a threshold, exiting the torque control mode and entering speed control mode, and responsive to the difference achieving a target range and driver demand achieving a value that depends on lateral acceleration of the vehicle, exiting the speed control mode.

An electrified axle system includes a pair of wheels, a super positioning torque vectoring differential coupled between the wheels and including a traction motor and a vectoring motor, and a controller. The controller operates the vectoring motor in speed control mode to reduce a speed difference between the wheels responsive to the difference exceeding a threshold, and operates the vectoring motor in torque control mode responsive to the difference falling within a target range and an accelerator pedal position achieving a value that depends on lateral acceleration associated with the system.

DETAILED DESCRIPTION

Various embodiments of the present disclosure are described herein. However, the disclosed embodiments are merely exemplary and other embodiments may take various and alternative forms that are not explicitly illustrated or described. The figures are not necessarily to scale; some features may be exaggerated or minimized to show details of components. Therefore, specific structural and functional details disclosed herein are not to be interpreted as limiting, but merely as a representative basis for teaching one of ordinary skill in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. However, various combinations and modifications of the features consistent with the teachings of this disclosure may be desired for particular applications or implementations.

Figure 1:
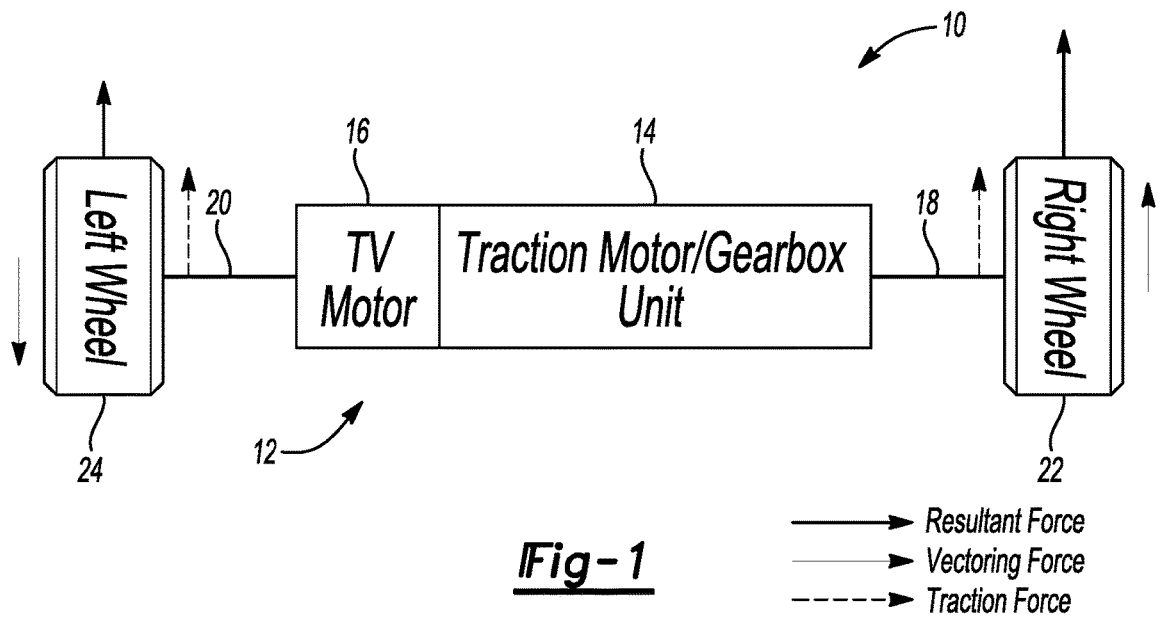
FIG. 1 is a schematic diagram of a vehicle axle with a super positioning torque vectoring differential.

Torque vectoring differentials allow the transfer of torque across a driven axle. And there are several implementations of torque vectoring functionality. One implementation involves the use of a super positioning solution which effectively decouples the main traction torque and the torque vectoring functionality. FIG. 1 shows a common physical realization of a super positioning torque vectoring differential 10 for an electrified axle 12. In this configuration, a main traction motor 14 is housed in a planetary gearbox unit and a torque vectoring motor 16 adds and subtracts equal and opposite torque on half-shafts 18, 20 associated with wheels 22, 24 respectively. The torque vectoring motor 16 can provide the vectoring functionality independent of the traction motor torque.

With open differentials, driving torque will typically follow the path of least resistance. As a result, whenever the vehicle accelerates on a split-μ surface or undergoes heavy acceleration while cornering, the tire with the least traction (or loading) always receives most of the driving torque-limiting vehicle acceleration. Mechanical limited slip differentials aid traction events on split-μ surfaces and on high power demand events by limiting the speed difference on the driven axle. A super positioning torque vectoring differential has the potential to mimic this behavior by using the torque vectoring functionality to actively control the wheel speed difference of the driven axle. Moreover, the super positioning torque vectoring differential also allows for non-zero speed difference control which may help the handling behavior of the vehicle.

Here, we propose control algorithms that utilize the torque vectoring functionality of a super positioning torque vectoring differential to control the wheel speed difference on the driven axle. In some examples, the control algorithms may actively monitor the driven wheel speed difference along with measurements of steering wheel angle, vehicle yaw rate, and/or vehicle acceleration to control the wheel speed difference according to a scheduled wheel speed difference target. This target may be a function of vehicle architecture, handling expectations, etc.

In general, the wheel torque ($\tau_{wLEFT}$, $\tau_{wRIGHT}$) of an axle driven by a super positioning torque vectoring differential is of the form $$\tau_{wLEFT} = \tfrac{1}{2}\tau_{tract} - \tfrac{1}{2}\tau_{TV} \quad (1)$$

$$\tau_{wRIGHT} = \tfrac{1}{2}\tau_{tract} + \tfrac{1}{2}\tau_{TV} \quad (2)$$

The traction torque ($\tau_{tract}$) is split evenly between the left and right wheels, whereas one half of the torque vectoring torque ($\tau_{TV}$) is applied in equal and opposite quantities onto each wheel. Thus, the torque vectoring functionality is independent of the main traction torque. Additionally, the application of the torque vectoring torque has no effect on the longitudinal speed of the vehicle since torque is applied in equal and opposite quantities. By defining the wheel speed difference ($\Delta\omega$) as the difference between the right wheels speed ($\omega_{RIGHT}$) and left wheel speed ($\omega_{LEFT}$) as in equation (3), the simple feedback control loop given in FIG. 2 can be used for closed loop control of the driven axle wheel speed difference:

$$\Delta\omega = \omega_{RIGHT} - \omega_{LEFT} \quad (3)$$

Figure 2:
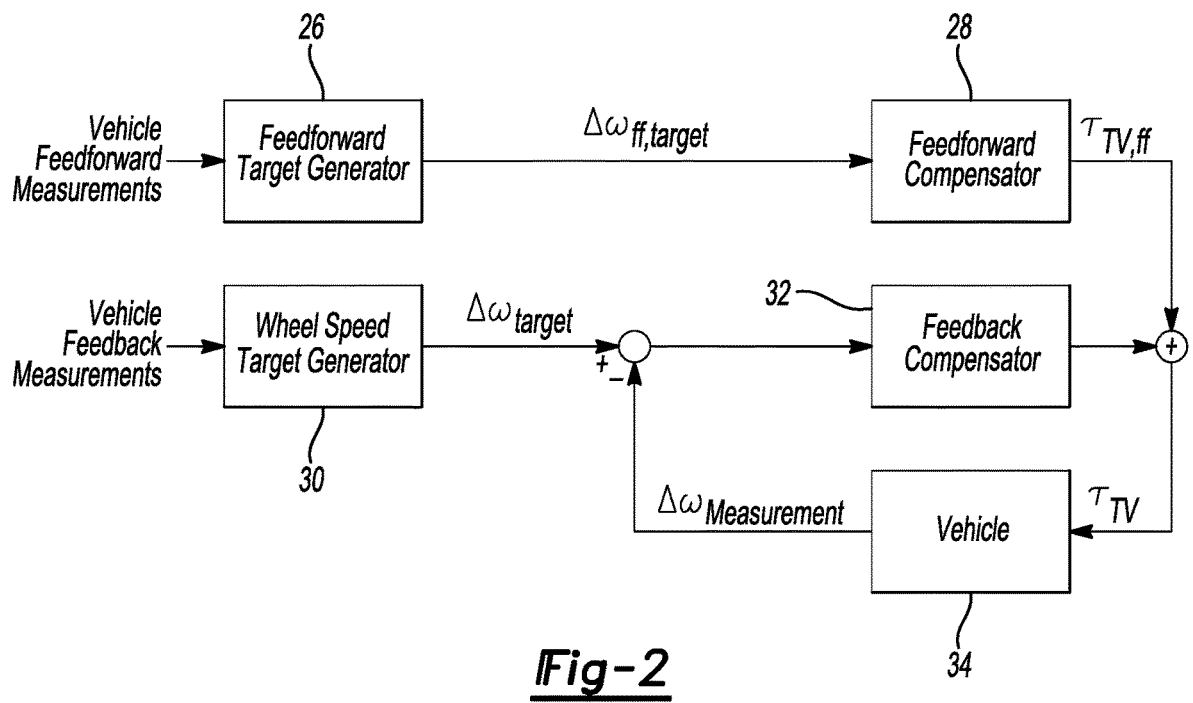
FIG. 2 is a block diagram of a closed loop feedforward and feedback control system for the super positioning torque vectoring differential of FIG. 1.

In the feedforward loop shown in FIG. 2, Feedforward Target Generator 26 utilizes various vehicle measurements such as steering wheel angle, yaw rate, and lateral acceleration to generate a feedforward delta wheel speed target ($\Delta\omega_{ff,target}$). The feedforward delta wheel speed target takes into consideration the driver's steering input and maps it to a desired wheel speed difference which will achieve a desired yaw rate. Feedforward Compensator 28, $G_{feedforward}$, maps the wheel speed target to a feedforward torque vectoring torque request, $\tau_{TV,ff}$. In the feedback loop shown in FIG. 2, Wheel Speed Target Generator 30 utilizes various vehicle measurements such as steering wheel angle, yaw rate, and lateral acceleration to generate a delta wheel speed target. The delta wheel speed target takes into consideration the driver's steering input and maps it into a desired wheel speed difference, which will result in a desired yaw rate. The wheel speed target is compared to the measured wheel speed difference and the error signal is minimized by Feedback Compensator 32. The Feedback Compensator 32 can be in the form of any feedback controller such as a PID controller. The output of the Feedback Compensator 32 is the torque vectoring torque request that will minimize the error between the target and the measurements. The final torque vectoring torque request for vehicle 34 is calculated as $$\tau_{TV} = G_{feedforward}\Delta\omega_{ff,target} + G_{feedback}(\Delta\omega_{target} - \Delta\omega_{measurement}) \quad (4)$$

Figure 3:
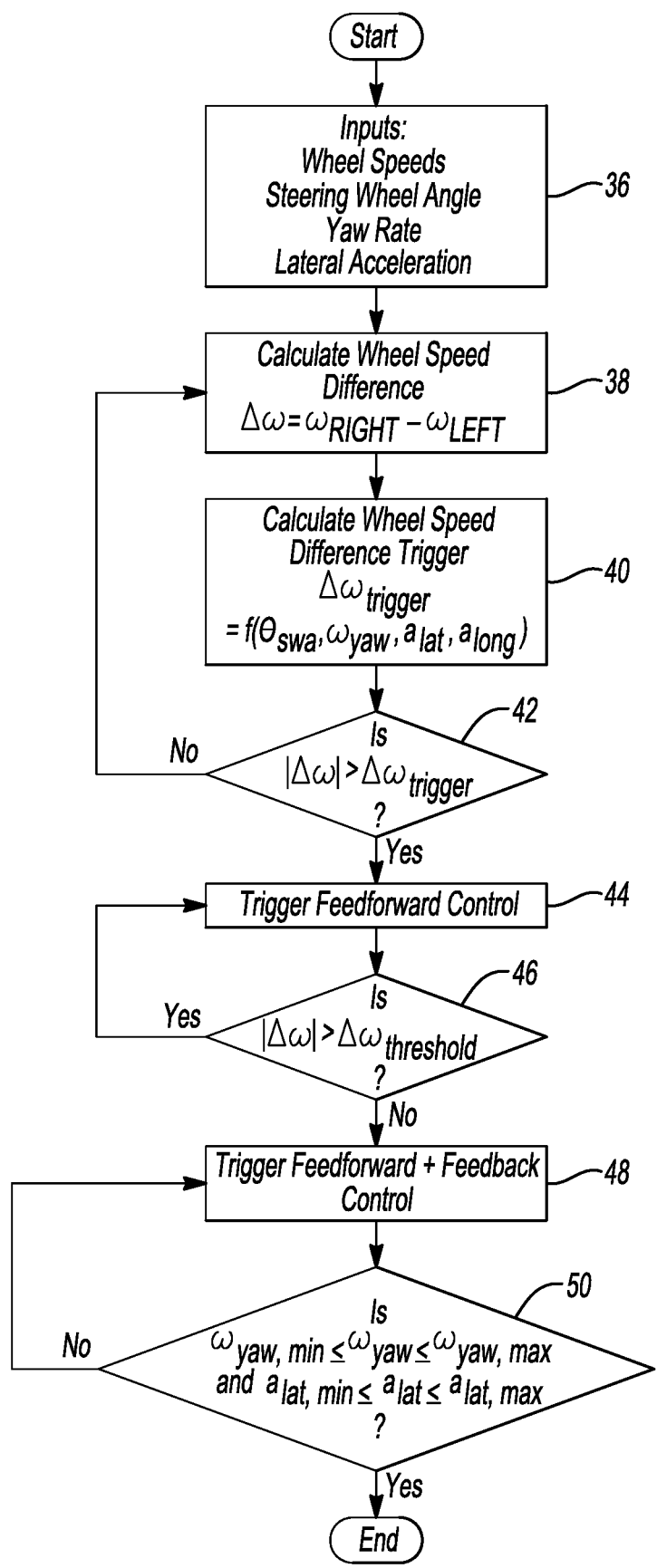
FIG. 3 is a flow chart of an algorithm for implementing the control system of FIG. 2.

The flowchart given in FIG. 3 outlines an example algorithm for a control system. At operation 36, wheel speeds, steering wheel angle, yaw rate and lateral acceleration are shown as inputs. Other and/or different inputs, however, may be used. Given the appropriate measurements, the driven axle wheel speed difference ($\Delta\omega$) is calculated at operation 38 in typical fashion. At operation 40, the wheel speed difference at which the control system is triggered ($\Delta\omega_{trigger}$) is calculated based on vehicle measurements such as steering wheel angle, yaw rate, and acceleration. The wheel speed difference at which the control system is triggered can be a time-varying quantity depending on the state of the vehicle 34, and may be calculated or determined as desired. If the driven axle wheel speed difference exceeds the wheel speed difference at which the control system is triggered at operation 42, the feedforward path shown in FIG. 2 is activated at operation 44. The feedforward control path is intended to quickly drive the driven axle wheel speed difference to within a pre-calculated and time-varying threshold velocity ($\Delta\omega_{threshold}$). Otherwise, the algorithm returns to operation 38. If the driven axle wheel speed difference does not exceed the pre-calculated and time-varying threshold velocity at operation 46, the feedback path shown in FIG. 2 is also activated at operation 48 to further drive the driven axle wheel speed difference to the target, which may be set as desired based on vehicle configuration, etc. Otherwise, the algorithm returns to operation 44. Once the vehicle measurements such as yaw rate or lateral acceleration fall within their intended targets at operation 50, the closed loop control is deactivated and the algorithm ends. Otherwise, the algorithm returns to operation 48.

Figure 4:
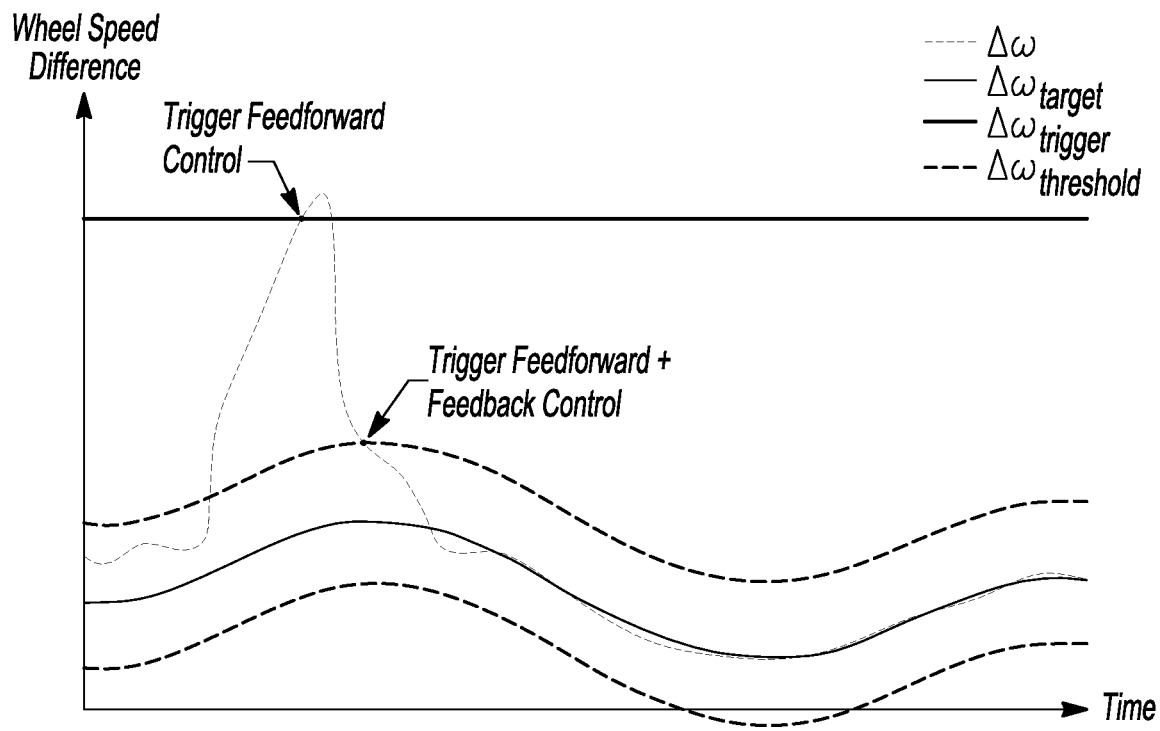
FIG. 4 is an example time response plot resulting from execution of the algorithm of FIG. 3.

FIG. 4 shows an example of the time response of the control system. The feedforward control is activated as soon as the measured wheel speed difference exceeds the trigger velocity. The feedforward compensator quickly drives the wheel speed difference to the threshold velocity. Once the measured wheel speed difference reaches the threshold velocity, the feedback control loop is activated and the feedback compensator further drives the driven wheel speed difference to the wheel speed target.

Under typical conditions, torque vectoring differentials are operated in torque control mode. That is, the control system responsible for torque vectoring considers differences in torque when making command decisions for the corresponding differential. The schemes contemplated above, however, suggest speed control. That is, the control system considers differences in speed when making command decisions. A super positioning torque vectoring differential can thus be operated in torque control mode or speed control mode. Strategically entering and exiting these modes can improve vehicle control and handling in certain circumstances.

Figure 5:
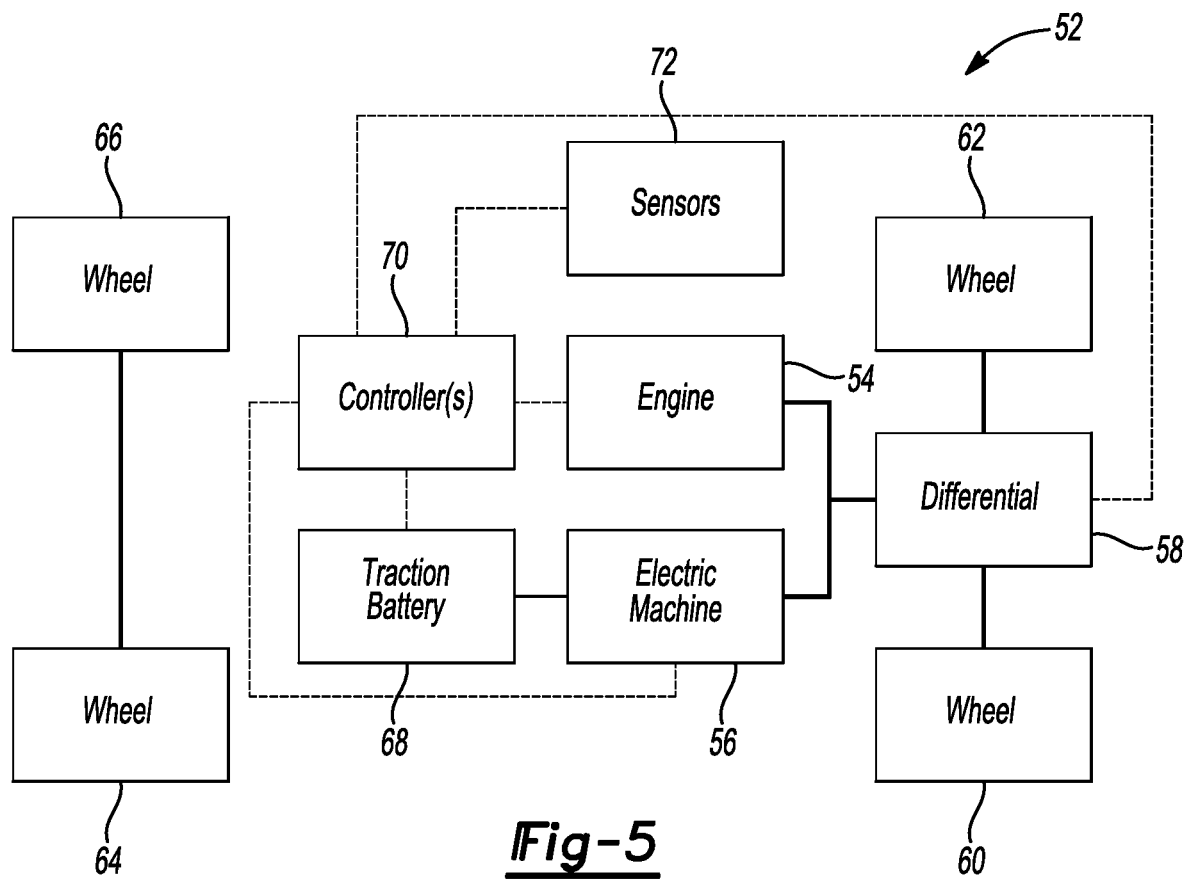
FIG. 5 is a schematic diagram of a vehicle.

With reference to FIG. 5, an example vehicle 52 includes an engine 54, an electric machine 56, a super positioning torque vectoring differential 58, and wheels 60, 62, 64, 66. The vehicle 52 also includes a traction battery 68, controller(s) 70 (one or more controllers), and sensors 72 (accelerator pedal position sensor, brake pedal position sensor, lateral acceleration sensor, longitudinal acceleration sensor, steering angle sensor, wheels speed sensors, yaw rate sensor, etc.). Heavy solid lines indicate mechanical coupling, light solid lines indicate electrical coupling, and dashed lines indicate communication. Other vehicle configurations, such as those lacking electric machines or engines, etc., are also contemplated. Each of the engine 54 and electric machine 56 is arranged to provide propulsive torque to the wheels 60, 62 via the super positioning torque vectoring differential 58. The traction battery 68 is arranged to provide energy to and receive energy from the electric machine 56. The controller(s) 70 are in communication with and/or command the engine 54, electric machine 56, differential 58, traction battery 68, and sensors 72.

Upon vehicle turning, the controller(s) 70 may command the super positioning torque vectoring differential 58 to provide the appropriate propulsive torque using the traction motor and create a torque difference using the vectoring motor to bias torque to the outside wheel. If executing a left turn, the controller(s) 70 may command the super positioning torque vectoring differential 58 to apply the appropriate traction torque to maintain the desired longitudinal acceleration and apply a vectoring torque to create a torque difference to bias torque toward the wheel 62. If executing a right turn, the controller(s) 70 may command the super positioning torque vectoring differential 58 to apply the appropriate traction torque to maintain the desired longitudinal acceleration and apply a vectoring torque to create a torque difference to bias torque toward the wheel 60. Such control if executed on a low-p surface (such as ice), may cause the outer wheel to achieve excessive speeds relative to the inner wheel. Provided the controller(s) 70 implement the algorithm of FIG. 3 (or a similar algorithm), the excessive speed difference may exceed the wheel speed difference at which the control system of FIG. 2 is triggered. The controller(s) 70 will thus toggle from operating in torque control mode to speed control mode as the driven axle wheel speed difference is reduced to the target as described above.

Once the target wheel speed difference is achieved, the controller(s) 70 may exit speed control mode and return to torque control mode. Alternatively, the controller(s) 70 may remain in speed control mode until accelerator pedal position or driver demand decreases to a predefined threshold that may depend on lateral acceleration. Lateral acceleration tends to be greater when turning on short radii as compared with long radii. Hence, the predefined threshold may be greater for lower values of lateral acceleration and lesser for higher values of lateral acceleration. This strategy will allow the system to exit speed control mode at higher speeds while on larger radii turns and exit speed control mode at lower speeds while on shorter radii turns. For example, if the vehicle 52 is making a small radius turn at 30 mph, the predetermined threshold may be set at 10% (assuming 100% is the pedal position for a fully pressed accelerator pedal and 0% is the pedal position for a fully released accelerator pedal). And if the vehicle 52 is making a large radius turn at 30 mph, the predetermined threshold may be set at 25%. If pedal position is decreasing toward 0% under these scenarios because the driver is backing off the accelerator pedal, the controllers(s) 70 will exit speed control mode (and return to torque control mode) at a higher speed on the large radius turn as compared with the small radius turn.

The processes, methods, logic, or strategies disclosed may be deliverable to and/or implemented by a processing device, controller, or computer, which may include any existing programmable electronic control unit or dedicated electronic control unit. Similarly, the processes, methods, logic, or strategies may be stored as data and instructions executable by a controller or computer in many forms including, but not limited to, information permanently stored on various types of articles of manufacture that may include persistent non-writable storage media such as ROM devices, as well as information alterably stored on writeable storage media such as floppy disks, magnetic tapes, CDs, RAM devices, and other magnetic and optical media. The processes, methods, logic, or strategies may also be implemented in a software executable object. Alternatively, they may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure and claims. As previously described, the features of various embodiments may be combined to form further embodiments that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
    a super positioning torque vectoring (SPTV) differential coupled between a pair of wheels; and
    a controller configured to
        responsive to a speed difference between the wheels exceeding a threshold, operate the SPTV differential in speed control mode to reduce the difference,
        responsive to the difference achieving a target range and an accelerator pedal position achieving a value that depends on lateral acceleration of the vehicle, exit the speed control mode, and
        increase the value as the lateral acceleration decreases.

2. The vehicle of claim 1, wherein the controller is further configured to decrease the value as the lateral acceleration increases.

3. The vehicle of claim 1, wherein the controller is further configured to operate the SPTV differential in torque control mode after the exit.

4. The vehicle of claim 1, wherein the controller is further configured to, responsive to turning of the vehicle while the difference is less than the threshold, operate the SPTV differential in torque control mode to bias propulsive torque toward an outer one of the wheels.

5. The vehicle of claim 1 further comprising an engine and electric machine each configured to provide propulsive torque to the SPTV differential.

6. The vehicle of claim 1, wherein the wheels are front wheels or rear wheels.

7. A method for a vehicle comprising:
    by a controller,
        responsive to turning of the vehicle, operating a super positioning torque vectoring differential in torque control mode,
        responsive to wheel speed difference exceeding a threshold, exiting the torque control mode and entering speed control mode,
        responsive to the difference achieving a target range and driver demand achieving a value that depends on lateral acceleration of the vehicle, exiting the speed control mode, and
        decreasing the value as the lateral acceleration increases.

8. The method of claim 7, further comprising increasing the value as the lateral acceleration decreases.

9. The method of claim 7, wherein the entering results in the speed difference decreasing.

10. The method of claim 7, wherein the operating results in the wheel speed difference increasing.

11. An electrified axle system comprising:
    a pair of wheels;
    a super positioning torque vectoring differential coupled between the wheels and including a traction motor and a vectoring motor; and
    a controller configured to operate the vectoring motor in speed control mode to reduce a speed difference between the wheels responsive to the difference exceeding a threshold, and to operate the vectoring motor in torque control mode responsive to the difference falling within a target range and an accelerator pedal position achieving a value that depends on lateral acceleration associated with the system.

12. The system of claim 11, wherein the controller is further configured to increase the value as the lateral acceleration decreases.

13. The system of claim 11 wherein the controller is further configured to decrease the value as the lateral acceleration increases.

14. The system of claim 11, wherein operating the vectoring motor in torque control mode includes biasing torque toward an outer one of the wheels.

15. The system of claim 11, wherein the wheels are front wheels or rear wheels of a vehicle.

* * * * *